(12) United States Patent
Neel et al.

(10) Patent No.: US 7,215,880 B2
(45) Date of Patent: May 8, 2007

(54) ONE-TIME-USE CAMERA

(75) Inventors: John C. Neel, Pittsford, NY (US); Wilbert F. Janson, Jr., Shortsville, NY (US)

(73) Assignee: Eastman Kodak Company, Rochester, NY (US)

( * ) Notice: Subject to any disclaimer, the term of this patent is extended or adjusted under 35 U.S.C. 154(b) by 219 days.

(21) Appl. No.: 10/979,028

(22) Filed: Nov. 1, 2004

(65) Prior Publication Data

US 2006/0093338 A1    May 4, 2006

(51) Int. Cl.
G03B 17/04    (2006.01)
G03B 9/08    (2006.01)

(52) U.S. Cl. ................................. 396/6; 396/452
(58) Field of Classification Search ........... 396/6, 396/348, 439, 452, 535, 538, 349
See application file for complete search history.

(56) References Cited

U.S. PATENT DOCUMENTS

| | | | |
|---|---|---|---|
| 360,499 A | 4/1887 | Whittell | 396/6 |
| 1,298,312 A | 3/1919 | Earle | 396/6 |
| 1,366,158 A | 1/1921 | Brown | 396/6 |
| 3,820,144 A * | 6/1974 | Neau et al. | 396/463 |
| 5,710,953 A | 1/1998 | Stephenson | 396/535 |
| 5,858,640 A | 1/1999 | Cowdery-Corvan et al. | 430/619 |
| 5,933,659 A | 8/1999 | Glover et al. | 396/6 |
| 6,031,996 A | 2/2000 | Stephenson, III | 396/6 |
| 6,037,115 A | 3/2000 | Alton et al. | 430/619 |
| 6,040,130 A | 3/2000 | Alton et al. | 430/617 |
| 6,190,061 B1 | 2/2001 | DiRisio | 396/511 |
| 6,298,200 B1 | 10/2001 | Allen et al. | 396/284 |
| 6,302,599 B1 | 10/2001 | Stoebe et al. | 396/575 |
| 6,304,722 B1 | 10/2001 | Lawther et al. | 396/6 |

FOREIGN PATENT DOCUMENTS

JP    01-126634    5/1989

* cited by examiner

Primary Examiner—W. B. Perkey
Assistant Examiner—Rishi S. Suthar
(74) Attorney, Agent, or Firm—Roland R. Schindler, II (57) ABSTRACT

In one aspect of the invention, a camera is provided. The camera has a photosensitive element; a light blocking expansion structure combined with the photosensitive element to form a light tight chamber there between. The light blocking expansion structure has an aperture to focus light from a scene to form an image on the photosensitive element; the light blocking expansion structure is adapted to automatically expand from an initial position to an extended position, with expansion of the expansion structure position in the aperture relative to the photosensitive element. Expansion of the expansion structure drives a shutter system to start and end an exposure of the photosensitive element to light from the scene. A trigger system is manually operable so as to initiate expansion of the expansion structure from the initial position.

38 Claims, 10 Drawing Sheets

ONE-TIME-USE CAMERA

FIELD OF THE INVENTION

The present invention relates to film cameras, and, more particularly to one-time-use film cameras.

BACKGROUND OF THE INVENTION

Cameras such as one-time-use cameras sold by Eastman Kodak Company, Rochester, N.Y. and others have been developed that provide a low-cost combination of a roll of film and a camera. Examples of such cameras are described in commonly assigned U.S. Pat. No. 6,190,061 entitled "Photographic Film Unit And One-Time-Use Camera, issued Feb. 20, 2001 in the name of DiRisio; U.S. Pat. No. 6,298,200 entitled "Exposure Count Indicator For Camera", issued Oct. 2, 2001 in the name of Allen et al.; and U.S. Pat. No. 6,304,722 entitled "One-Time-Use Camera With Film Winding Detection To Enable Exposure Related Component", issued Oct. 16, 2001 in the name of Lawther et al. Such cameras provide quality images at a relatively low cost level that has proven exceptionally popular with consumers. Hundreds of millions of such cameras are sold each year.

However, there is a continuing desire to reduce the cost of photography to a point where it is accessible to a wide variety of consumers. There is a further continuing desire to reduce the size of cameras so that they can be conveniently carried and used.

One way to reduce the cost of one-time-use cameras is to reduce the number of photographic images that can be recorded by such cameras. Specifically, it has been known since the early days of photography to provide cameras that adapted to capture a single image on a photosensitive element. Examples of such cameras are shown and described in U.S. Pat. No. 360,499 entitled "Photographic Apparatus", issued Apr. 5, 1887 in the name of Whittell; U.S. Pat. No. 1,298,312 entitled "Camera", issued Mar. 25, 1919 in the name of Earle; and U.S. Pat. No. 1,366,158 entitled "Camera", issued Jan. 18, 1921 in the name of Brown.

The cameras described in the '499, '312 and 158 patents can be costly to make, as they require manual assembly. Further, the cameras described therein require manual control of the exposure of the photosensitive element and are difficult to operate. In the '499 patent, a user must take manual action to begin exposure and manual action to end exposure. It will be appreciated however, that relying upon human action to control exposure inherently means that exposure time will be substantively longer than the exposure times that are available using conventional mechanical cameras and that are appropriate for still life image capture. What is desired is a camera system that enables image capture with short exposure times so as to allow a camera to be used to capture images of wide variety scene types. Further, it will be appreciated that it is desirable to provide a low cost one-time-use camera that eliminates the possibility of human error in defining the exposure time, so that images captured by such a low cost one-time-use camera provide a predictable exposure time.

SUMMARY OF THE INVENTION

In one aspect of the invention, a camera is provided. The camera has a photosensitive element; a light blocking expansion structure combined with the photosensitive element to form a light tight chamber there between. The light blocking expansion structure has an aperture to focus light from a scene to form an image on the photosensitive element; the light blocking expansion structure is adapted to automatically expand from an initial position to an extended position, with expansion of the expansion structure position in the aperture relative to the photosensitive element. Expansion of the expansion structure drives a shutter system to start and end an exposure of the photosensitive element to light from the scene. A trigger system is manually operable so as to initiate expansion of the expansion structure from the initial position.

In another aspect of the invention, a camera is provided, the camera comprising: a photosensitive element, and a light block expansion structure combined with the photosensitive element. The expansion structure has a first shape and is adapted to store potential energy when the shape of the expansion structure is reduced. The expansion structure is further adapted to release a first portion of the potential energy to expand to move an aperture in the expansion structure through at least one position at which light passing through the aperture forms an image on the photosensitive element. At least one shutter system is provided to control light passing between a scene and the photosensitive element. The expansion structure and the at least one light control surface are adapted to cooperate so that a second portion of the stored potential energy is released during exposures to start and end an exposure at the photosensitive element.

In still another aspect of the invention, a camera comprising: a photosensitive element; a light blocking expansion structure combined with the photosensitive element to form an air tight chamber therebetween, the light blocking expansion structure having an aperture to focus light from a scene to form an image on the photosensitive element when the light blocking expansion structure has a first shape, with the air pressure in the air tight chamber reduced to a point where atmospheric pressure reduces the size of the expansion structure; a shutter system functionally associated with the light blocking expansion structure so that expansion of the light blocking expansion structure drives the shutter system to start and end exposure of the photosensitive element; and a trigger system adapted to allow air into the air tight chamber so as to controllably allow the light blocking expansion structure to expand to the first shape.

In yet another aspect of the invention, a camera comprising the steps of: providing a web of a photosensitive material; applying a shutter system on the photosensitive element; providing an expansion structure of an elastically deformable material in a layer to the photosensitive material to form a light tight region between the expansion layer and the photosensitive material, said expansion structure having an aperture in the expansion layer adapted to focus light from a scene to form an image on the photosensitive element when the expansion element is in a selected shape; defining an extended shape of the expansion layer; elastically deforming the expansion layer into an initial shape, to store potential energy therein, said potential energy being releasable to cause the expansion layer to change from the initial shape to the extended shape; and providing a trigger system on the expansion layer, to initiate expansion of the expansion structure when the expansion structure in the initial shape; wherein the step of providing a shutter system comprises providing a shutter system that is movably attached to the expansion layer so that as the expansion layer changes shape, the light control layer controllably confronts the aperture to allow a limited amount of light to pass from a scene through the aperture to the photosensitive element.

DETAILED DESCRIPTION OF THE INVENTION

Figures 1, 2, 3:
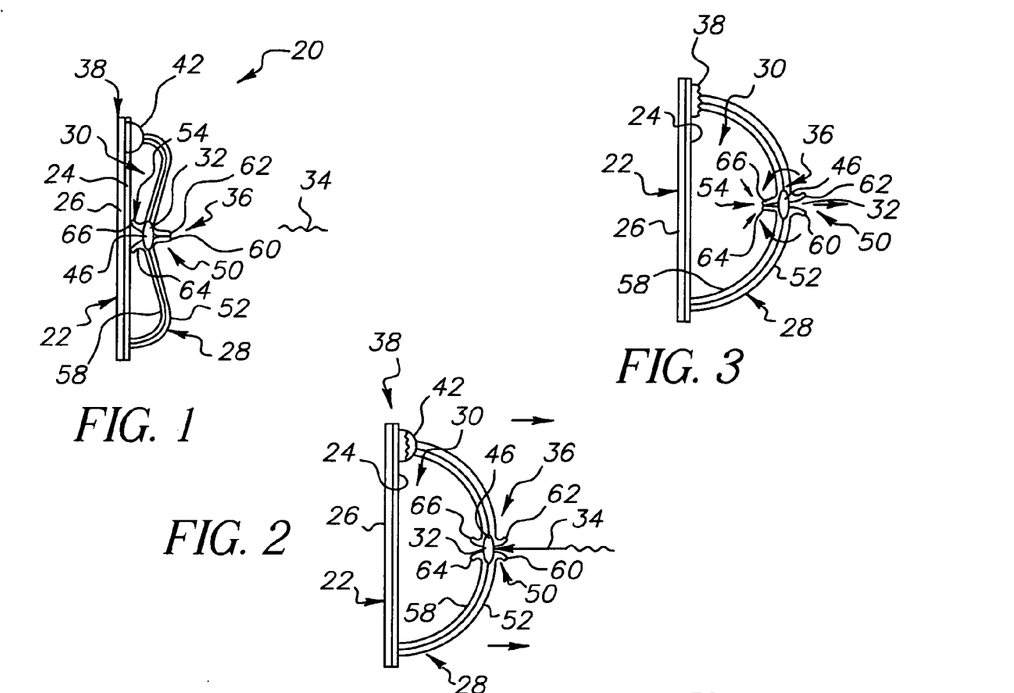
FIG. 1 shows a section view of one embodiment of the camera of the invention with an expansion structure in an initial position.
FIG. 2 shows a section view of one embodiment of the camera of the invention in a position between the initial position and an extended position.
FIG. 3 shows a section view of one embodiment of the camera of the invention in an extended position.
Figure 4:
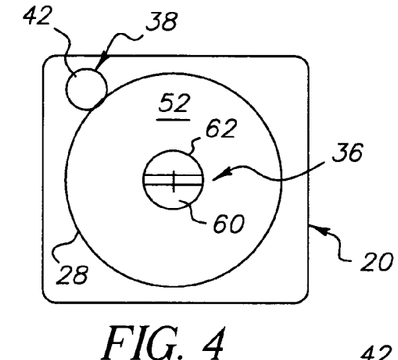
FIG. 4 shows a front view of one embodiment of the camera of the invention with an expansion structure in an initial position.
Figure 5:
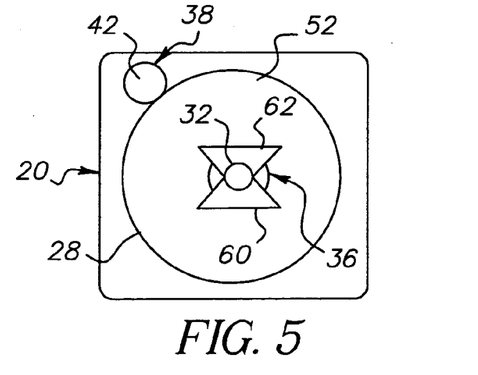
FIG. 5 shows a front view of one embodiment of the camera of the invention in a position between the initial position and an extended position.
Figure 6:
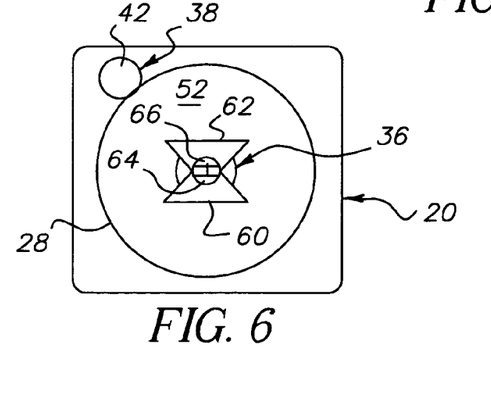
FIG. 6 shows a front view of one embodiment of the camera of the invention in an extended position.

A first embodiment of a camera 20, in accordance with the invention is shown in cross-section views in FIGS. 1–3 and in frontal views in FIGS. 4–6. In the embodiment shown in FIGS. 1–6, camera 20 comprises a photosensitive element 22 with a photosensitive layer 24 on a support 26. A light blocking expansion structure 28 is combined with photosensitive element 22 to form a light tight chamber 30 therebetween. Expansion structure 28 has an aperture 32 to focus light 34 from a scene (not shown) to form an image on photosensitive element 22. Expansion structure 28 is adapted to automatically expand from an initial position shown in FIGS. 1 and 4, through a range of intermediate positions, one example of which is shown in FIGS. 2 and 5, to an extended position shown in FIGS. 3 and 6. Expansion of expansion structure 28 positions aperture 32 relative to the photosensitive element 22 and drives a shutter system 36 to start and end and exposure of photosensitive element 22 to light from the scene. A trigger system 38 is provided. Trigger system 38 is manually operable to allow a user to controllably initiate expansion of light blocking expansion structure 28 from the initial position.

Expansion structure 28 can take a variety of forms. In the embodiment shown in FIGS. 1–3, expansion structure 28 is formed in an extended position (shown in FIG. 3) and is capable of being elastically deformed into the initial position (shown in FIG. 1). When this occurs, potential energy is stored in expansion structure 28. Expansion structure 28 is held in the initial position until a release of expansion structure 28 is initiated. This occurs when trigger system 38 is operated. When this occurs, expansion structure 28 expands from the initial position (FIG. 1) through a range of intermediate positions (e.g. FIG. 2) to the extended position (FIG. 3). As expansion structure 28 expands it drives shutter system 36 to start an exposure by transitioning from a state where shutter system 36 blocks light from the scene from photosensitive element 22 allows to a state where shutter system 36 allows light from the scene to form an image on photosensitive element 22. As expansion structure 28 further expands, it drives shutter system 36 to a state where shutter system 36 blocks light from the scene to end the exposure of photosensitive element 22 to light from a scene.

In the embodiment of FIGS. 1–6, expansion structure 28 is combined with photosensitive element 22 and with optimal lens element 46 to form chamber 30, with a vacuum therein. The vacuum in chamber 30 causes external air pressure to bias the expansion structure 28 into the initial position where it is held. As shown in FIGS. 1–6, in this embodiment, trigger system 38 comprises a vacuum seal control 42 that can be manually depressed so that external air pressure can fill chamber 30 at a time of a user's choosing. As external air pressure fills chamber 30, expansion structure 28 can expand to the extended position.

I will be appreciated that camera 20 uses the expansion of expansion structure 28 to drive the operation of shutter system 36 and is not reliant upon manual control over exposure. However, this means that photosensitive element 22 is exposed to light 34 from a scene that passes through aperture 32 while aperture 32 is being moved by expansion structure 28. This movement of aperture 32 can induce a blur effect and/or create other unattractive image elements in an image recorded on photosensitive element 22. In one embodiment, this is managed by providing an aperture 32 that has a very small diameter to provide essentially infinite focal distance. In another embodiment, this can be addressed by providing a shutter system 36 that is adapted to allow light to pass to photosensitive element 22 for very short period of time so that there is little movement during the exposure time. However, both of these embodiments, while useful, reduce the amount of light that is available for image forming and can, therefore provide image capture only under specific imaging conditions.

In the embodiment shown in FIGS. 1–6, image capture over a broader range of imaging conditions can be provided by an aperture 32 that is adapted to focus light from a scene to form an image having a generally consistent appearance on photosensitive element 22 so long as when aperture 32 is positioned within a range of image forming positions as measured, for example, as a range of distances between photosensitive elements 22 and aperture 32. In the embodiment shown, aperture 32 has a lens element 46 that is adapted so that lens element 46 is capable of forming a focused image on photosensitive element 22 while lens element 46 is positioned within a range of image forming distances from photosensitive element 22 that are generally at least in part coextensive with a range of distances that aperture 32 and lens element 46 will be positioned by expansion structure 28 during expansion. In such embodiment, expansion structure 28 and shutter system 36 will be adapted to start and end an exposure of photosensitive element 22 while expansion structure 28 has aperture 32 and lens element 46 separated from photosensitive element 22 by a distance that is within the range of image forming distance.

As has been noted above, it is the expansion of expansion structure 28 that drives operation of shutter system 36. In general, shutter system 36 is defined so that it blocks light from reaching photosensitive element 22 when camera 20 is not being used to capture an image. Shutter system 36 is further defined so that it receives energy for operation from changes in the shape or other changes that occur in expansion structure 28 as expansion structure 28 expands from the initial position to the extended position. In operation, trigger system 38 is operated, and shutter system 36 continues to block light from reaching photosensitive element 22 while expansion structure 28 is expanding from the initial position to an exposure start position. When expansion structure 28 is expanded to the exposure start position, shutter system 36 allows light to pass from the scene to photosensitive element 22 and continues to do so until expansion structure 28 has expanded to an exposure end position. When expansion structure 28 reaches the exposure end position expansion structure 28 causes shutter system 36 to again block light from reaching photosensitive element 22.

FIGS. 1–6 show a first embodiment of a shutter system 36 having a first light blocking structure 50 provided on an outside 52 of expansion structure 28 proximate to aperture 32 and a second light blocking structure 54 provided on an inside 58 of expansion structure 28. As is shown in FIGS. 1 and 4, in this embodiment, camera 20 has a first light blocking structure 50 comprising outside shutters 60 and 62 that are shaped and functionally associated with an expansion structure 28 so that when expansion structure 28 is in any position between the initial position and an exposure start position, outside shutters 60 and 62 block light from reaching aperture 32. Outside shutters 60 and 62 are further shaped and functionally associated with expansion structure 28 so that as expansion structure 28 expands to the exposure start position, outside shutters 60 and 62 separate to allow light to pass to aperture 32 as shown, for example, in FIGS. 2 and 5. In the embodiment shown, outside shutters 60 and 62 are further shaped and functionally associated with expansion structure 28 so that outside shutters 60 and 62 remain separated despite further expansion of expansion structure 28 past the exposure start position as shown in FIGS. 3 and 6.

As is also shown in FIGS. 1–6, second light blocking structure 54 comprises inside shutters 64 and 66 shaped and joined to expansion structure 28 so that when expansion structure 28 reaches the exposure start position, the expansion of expansion structure 28 drives outside shutters 60 and 62 apart so that light from the scene can reach photosensitive element 22. Inside shutters 64 and 66 are further shaped and joined to expansion structure 28 so that as expansion structure 28 expands to an exposure end position, expansion structure 28 drives inside shutters 64 and 66 together to block light from the scene from reaching photosensitive element 22, this ending the exposure of photosensitive element 22.

Figure 7:
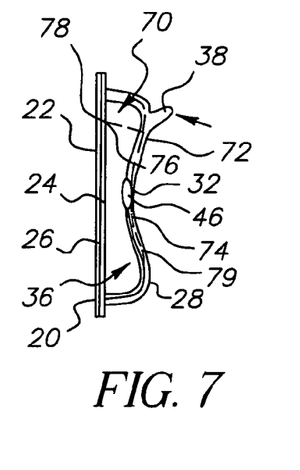
FIG. 7 shows a side section view of another embodiment of a camera of the invention with an expansion structure in an initial position.
Figure 8:
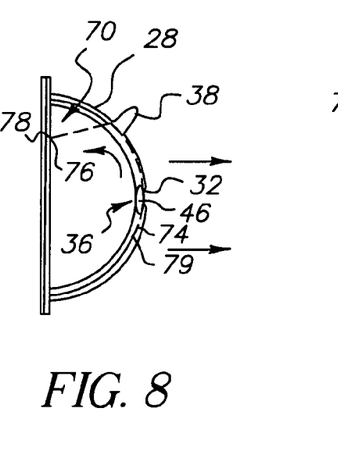
FIG. 8 shows a side section view of the embodiment of FIG. 7 with the expansion structure in a position between the initial position and an extended position.
Figure 9:
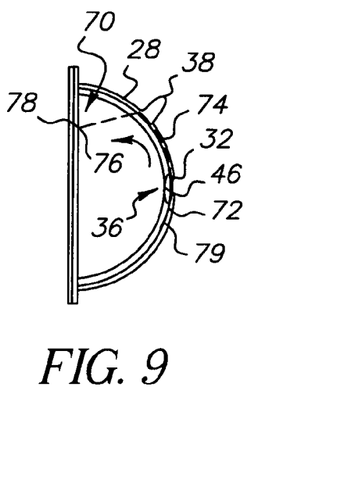
FIG. 9 shows a side section view of the embodiment of FIG. 7, with the expansion structure in an extended position.
Figure 10:
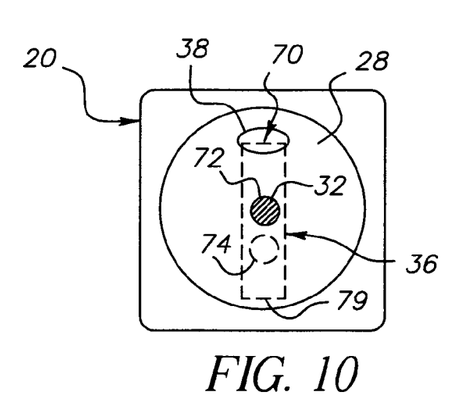
FIG. 10 shows a side section view of the embodiment of FIG. 7 with an expansion structure in an initial position.
Figure 11:
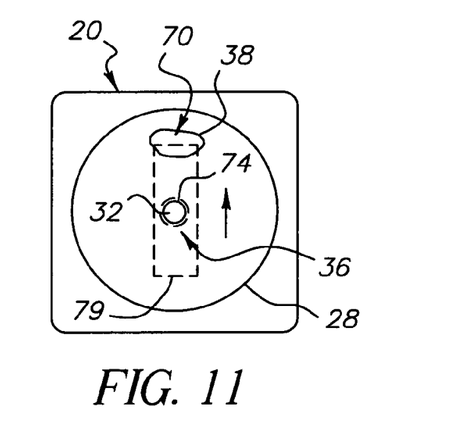
FIG. 11 shows a side section view of the embodiment of FIG. 7 with the expansion structure in a position between the initial position and an extended position.

FIGS. 7–9 and FIGS. 10–12 show, respectively, side section and frontal views of still another embodiment of a camera 20 of the present invention. In the embodiment of FIGS. 7–12, camera 20 has an expansion structure 28 that is adapted to be positioned in two statically stable configurations, an initial position shown in FIGS. 7 and 10, and an extended position shown in FIGS. 9 and 12. Expansion structure 28 is further adapted to expand through a range of intermediate positions one of which is illustrated in FIGS. 8 and 11. In this embodiment, expansion structure 28 is shaped to have an internal bias to hold expansion structure 28 in the initial position (FIGS. 7 and 10), and to further provide a bias that drives the expansion structure 28 to the expanded position (FIGS. 9 and 12) when a force is applied in a manner that urges a change in the shape of expansion structure 28 from the initial position toward an intermediary position.

Figure 12:
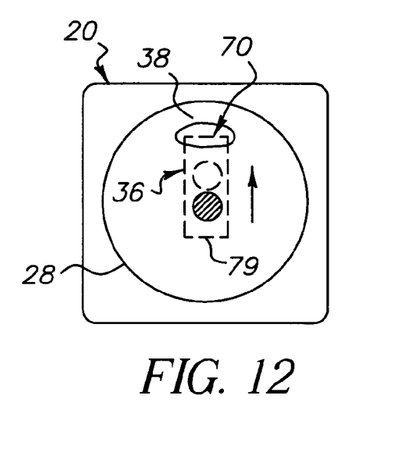
FIG. 12 shows a side section view of the embodiment of FIG. 7, with the expansion structure in an extended position.
Figure 13:
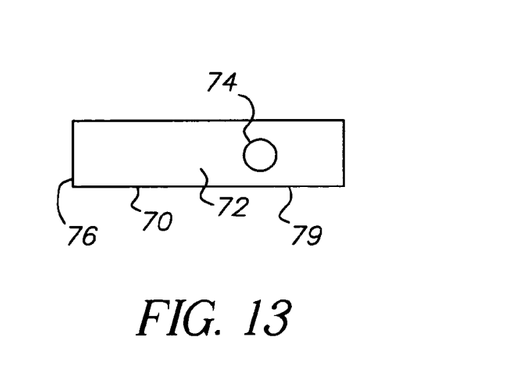
FIG. 13 shows a top view of a light blocking structure used in the embodiment of FIGS. 7–12.

In the embodiment shown in FIGS. 7–13, shutter system 36 comprises a light control surface 70 shown in cross-section in FIGS. 7–9, in phantom in FIGS. 10–12, and in a top view in FIG. 13. Light control surface 70 has a light blocking area 72 and a light admitting area 74. Light blocking area 72 prevents light from a scene from reaching photosensitive element 22 when light blocking area 72 is positioned in a light path from the scene to photosensitive element 22 as shown, for example, in FIGS. 7 and 10 and in FIGS. 9 and 12. Light admitting area 74 comprises an opening or a light transmission area in light control surface 70. When light admitting area 74 is positioned in the light path between the scene and photosensitive element 22 as shown in FIGS. 8 and 11, light admitting area 74 allows light to pass to photosensitive element 22. As is shown in FIGS. 10–12, in this embodiment, light control surface 70 is fixed at one end 76 to either photosensitive element 22 or to an end 78 of expansion structure 28 and joined at another end 79 to expansion structure 28 for sliding movement past aperture 32. In this embodiment, expansion of the expansion structure 28 causes aperture 32 to move with respect to light control surface 70 so as to selectively confront light blocking area 72 and light admitting area 74 to start and end on exposure by controllably blocking or allowing light from the scene to reach photosensitive element 22.

Figure 14:
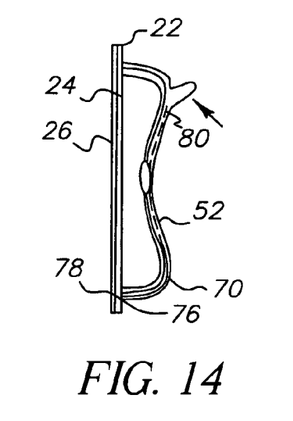
FIG. 14 shows a side section view of another embodiment of a camera of the invention with an expansion structure in an initial position.
Figure 15:
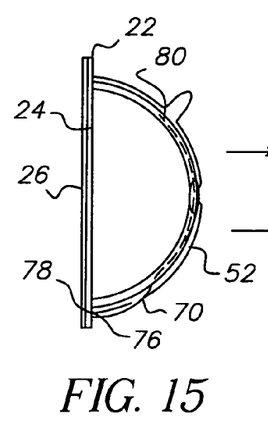
FIG. 15 shows a side section view of the embodiment of FIG. 14 with the expansion structure in a position between the initial position and an extended position.
Figure 16:
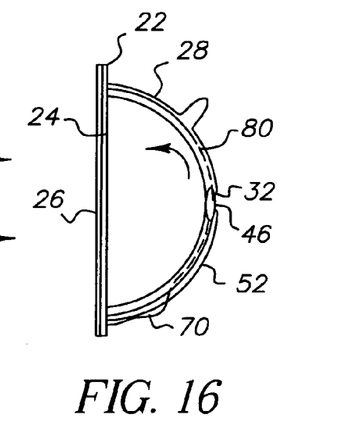
FIG. 16 shows a side section view of the embodiment of FIG. 14, with the expansion structure in an extended position.
Figure 17:
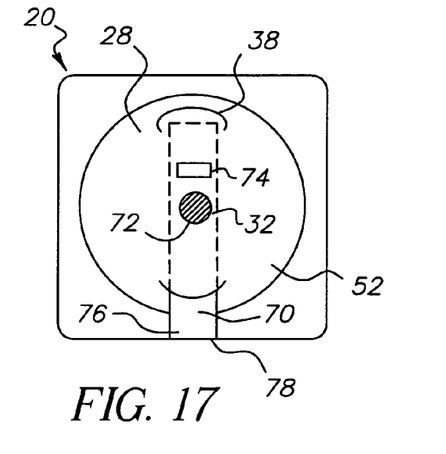
FIG. 17 shows a front view of the embodiment of FIG. 14 with an expansion structure in an initial position.
Figure 18:
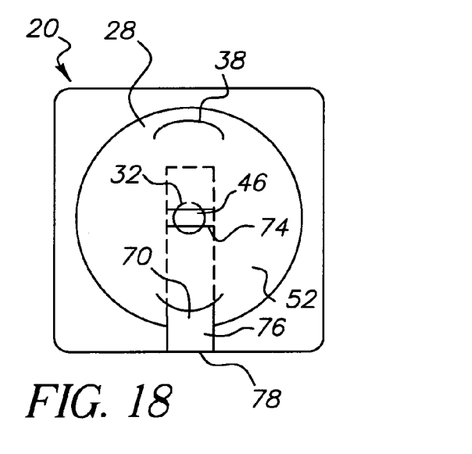
FIG. 18 shows a front view of the embodiment of FIG. 14 with the expansion structure in a position between the initial position and an extended position.
Figure 19:
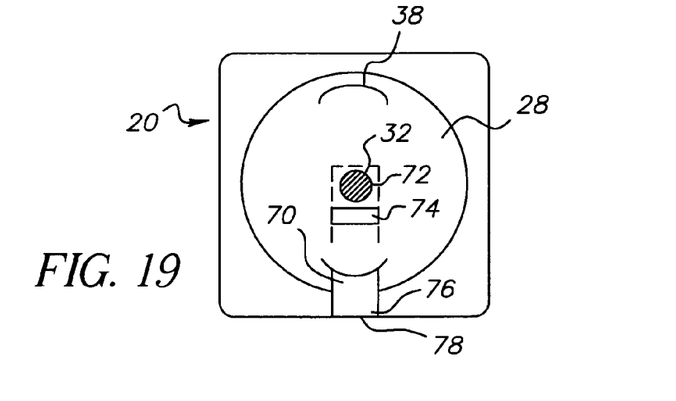
FIG. 19 shows a front view of the embodiment of FIG. 14, with the expansion structure in an extended position.

FIGS. 14–16 show a cross-section view and FIGS. 17–19 show a frontal view of another embodiment of camera 20. In this embodiment, a light control surface 70 is shown having a slit-shaped light admitting area 74. It will be appreciated that in other embodiments, other conventionally known shapes can be used for light admitting area 74 and that light admitting area 74 can be shaped so as to provide the formation of images on photosensitive element 22 in any other conventional form such as swipe or smear images. In this embodiment, light control surface 70 is also shown optionally located in part on outside 52 of expansion structure 28. As is shown in this embodiment, light control surface 70 is fixed at one end 76 to either photosensitive element 22 or to an end 78 of expansion structure 28 and joined at another end 79 to expansion structure 28. In this embodiment, expansion of the expansion structure 28 causes aperture 32 to be selectively moved to confront light blocking area 72 and light admitting area 74 to controllably block or allow light from the scene to reach photosensitive element 22. It will be appreciated that in other embodiments, light control surface 70 can be positioned entirely on outside 52 of expansion structure 28.

Figure 20:
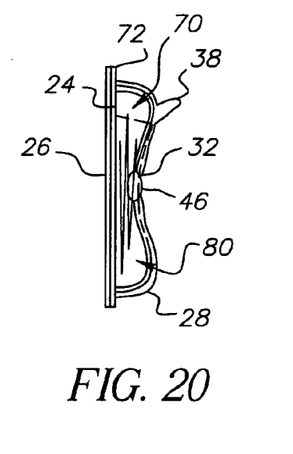
FIG. 20 shows a side section view of another embodiment of a camera of the invention with an expansion structure in an initial position.
Figure 21:
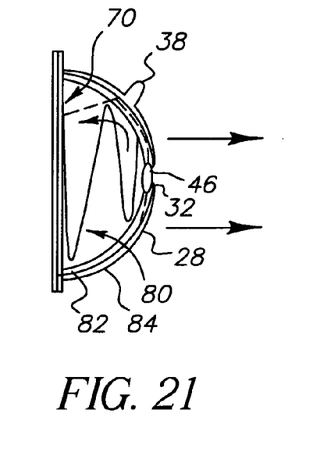
FIG. 21 shows a side section view of the embodiment of FIG. 20 with the expansion structure in a position between the initial position and an extended position.
Figure 22:
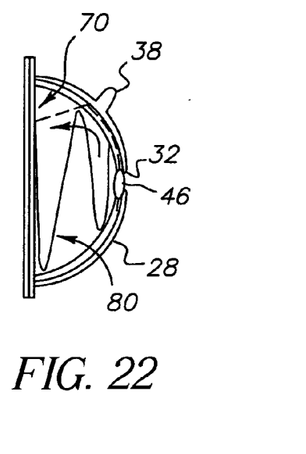
FIG. 22 shows a side section view of the embodiment of FIG. 20, with the expansion structure in an extended position.
Figure 23:
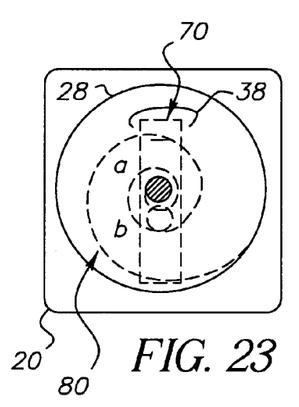
FIG. 23 shows a front view of the embodiment of FIG. 20 with an expansion structure in an initial position.
Figure 24:
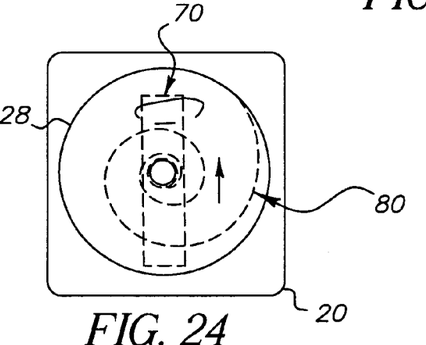
FIG. 24 shows a front view of the embodiment of FIG. 20 with the expansion structure in a position between the initial position and an extended position.
Figure 25:
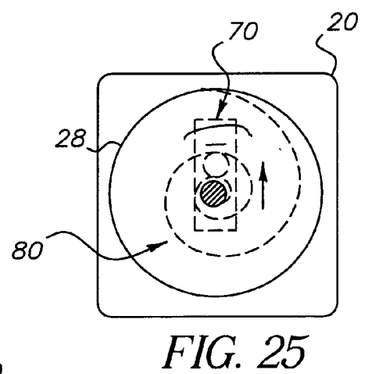
FIG. 25 shows a front view of the embodiment of FIG. 20, with the expansion structure in an extended position.
Figure 26:
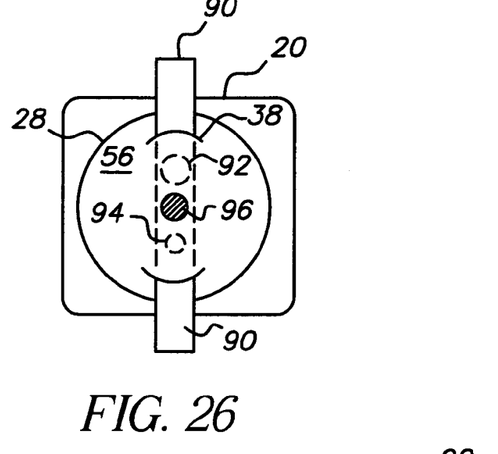
FIG. 26 shows a front view of a camera of the invention having a controllable aperture surface.

FIGS. 20–22 show cross-section views and FIGS. 23–25 show frontal views of another embodiment of a camera 20 of the present invention. In this embodiment, a flexible light blocking expansion structure 28 is provided having a resilient member 80, provided inside a flexible enclosure 82 providing a light control surface 70 and aperture 32 so that the only light that travels to photosensitive element 22 is light that passes through aperture 32. Resilient member 80 and flexible enclosure 82 can be separate, as shown, or can be provided, at least in part, in combination.

In the embodiment shown in FIGS. 20–25, resilient member 80 comprises a coil spring that is adapted to apply a bias that drives flexible enclosure 82 from the position shown in FIGS. 20 and 23 to the position shown in FIGS. 22 and 25. It will be appreciated that resilient member 80 can comprise a number of structures including but not limited to films, metals or polymers adapted to store potential energy and to release the potential energy for use in expansion. In this embodiment, flexible enclosure 82 is adapted to be flexibly moved between a first static position shown in FIGS. 20 and 23 wherein flexible enclosure 82 is in a initial position and wherein the flexible enclosure 82 has sufficient bias to resist the potential energy applied by resilient member 80 until trigger system 38 is actuated to overcome the bias thus allowing resilient member 80 to thrust flexible enclosure 82, light control surface 70 and aperture 32 formed therein out of the initial position.

Figure 27:
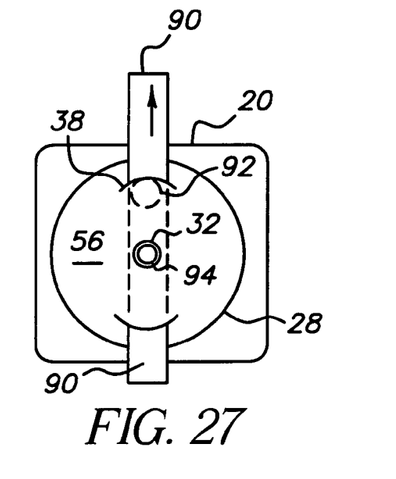
FIG. 27 shows a front view of the embodiment of FIG. 26 with a controllable aperture surface set to provide a large aperture.
Figure 28:
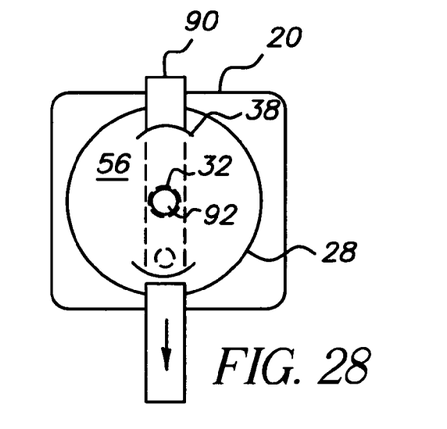
FIG. 28 shows a front view of the embodiment of FIG. 26 with a controllable aperture surface set to provide a large aperture.
Figure 29:
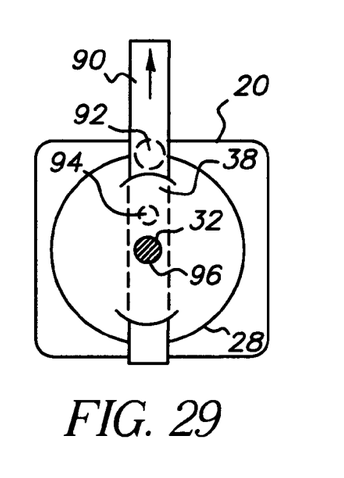
FIG. 29 shows a front view of the embodiment of FIG. 26 with a controllable aperture surface set in a light blocking position.
Figure 30:
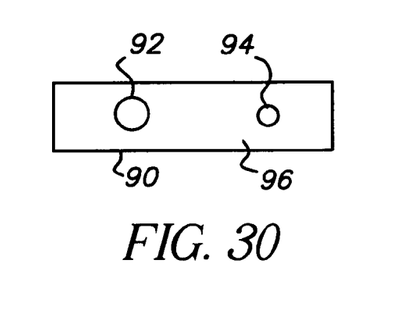
FIG. 30 shows-one embodiment of a controllable aperture surface used in the embodiments of FIGS. 26–29.

FIGS. 26–29 show yet another embodiment of the camera 20 of the invention having a controllable aperture surface 90. FIG. 30 shows a top view of the controllable aperture surface 90. External aperture surface 90 is shown having a large external aperture 92 and a small external aperture 94 with a light blocking area 96 therebetween positioned on expansion structure 28. In one embodiment of a camera 20, the external aperture surface 90 is sized at a size that is larger than the small external aperture 94 that is smaller than aperture 32. As shown in FIG. 27, a user of camera 20 can elect to use small external aperture 94 by positioning small external aperture 94 in the light path proximate to aperture 32 in image capture. Alternatively, as shown in FIG. 28, can elect to use aperture 32 for image capture by positioning large external aperture 92 proximate to aperture 32. As shown in FIG. 25, external aperture surface 90 also provides a light blocking area 96 that can be positioned over aperture 32 after exposure to prevent unintentional exposure in the event that expansion structure 28 is moved through the range of image capture positions after an image has been formed on photosensitive element 22.

Figure 31:
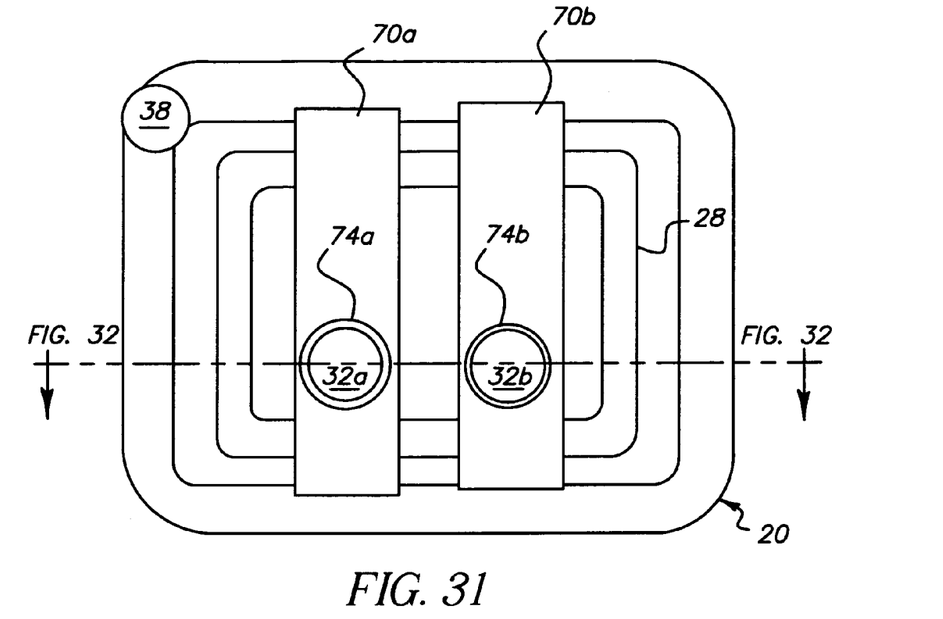
FIG. 31 shows a front view of one embodiment of a camera of the invention that is adapted to capture multiple images during expansion of expansion structure.

As is shown in FIG. 31, camera 20 can be adapted to capture multiple images during expansion of expansion structure 28. In one embodiment of this type, as shown in FIG. 31, expansion structure 28 is adapted to have two apertures 32*a* and 32*b*, each adapted to form an image on different portions of a photosensitive layer of photosensitive element 22 shown as portions 24*a* and 24*b* respectively in FIG. 33. Portions 24*a* and 24*b* can be formed on photosensitive element 22 or can be provided on separate portions.

Figure 32:
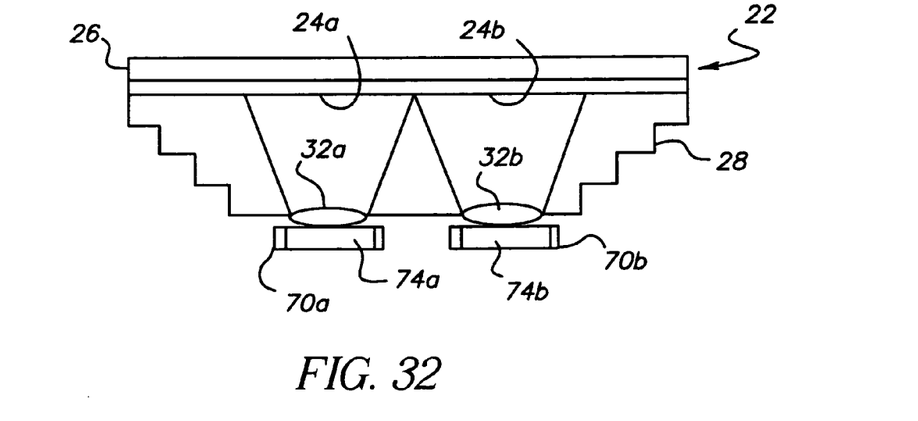
FIG. 32 shows a section view of the embodiment of FIG. 31.
Figure 33:
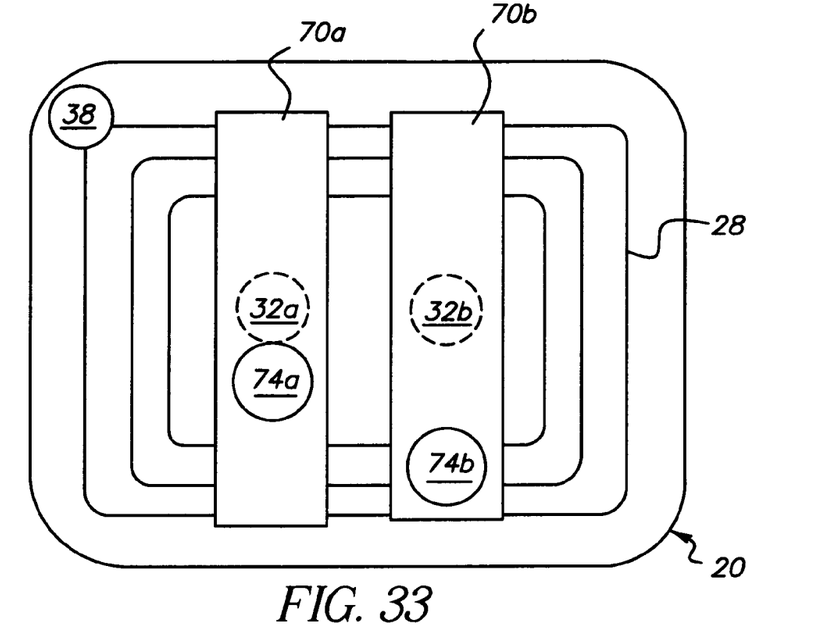
FIG. 33 shows a front view of another embodiment of the camera of FIG. 31 adapted to capture images having different exposure start or exposure end times.
Figure 34:
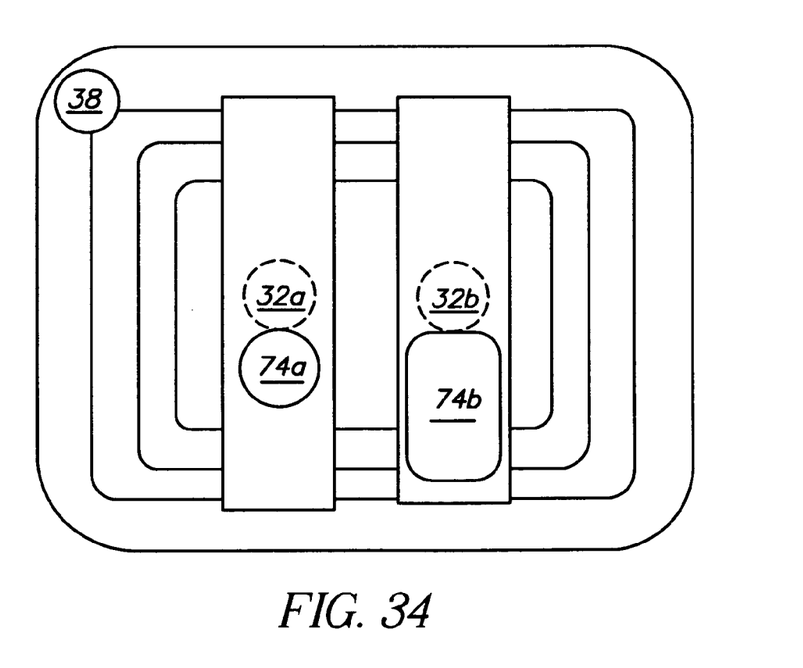
FIG. 34 shows a front view of another embodiment of the camera of FIG. 31 adapted to capture images having different exposure durations.

In any such embodiment, shutter system 36 is adapted to start and end exposure of images on portions 24*a* and 24*b* during expansion of expansion structure 28. In the embodiment of FIGS. 31 and 32, shutter system 36 can cause simultaneous exposure so as to provide stereo pair images. Alternatively, as shown in FIG. 33, shutter system 36 can be adapted to form multiple exposures with the exposure from aperture 32*a* and the exposure from aperture 32*b* having different exposure start and exposure end times because a light admitting area 74*a* of a light control surface 70*a* confronts aperture 32*a* at a different point in expansion of expansion structure 28 than light admitting area 74*b* of light control surface 70*b* confronts aperture 32*b*. Further, as shown in FIG. 34, camera 20 can have a shutter system 36 that enables images to be captured at different exposure levels so that, for example, images recorded on portion 24*a* are captured at one exposure level, providing an image representative of a first range of scene conditions, and an image recorded on portion 24*b* is representative of scene conditions at a different range of scene conditions. In the embodiment of FIG. 34, this is done by providing a light admitting area 74*a* that is differently sized than light admitting area 74*b*.

Figure 35:
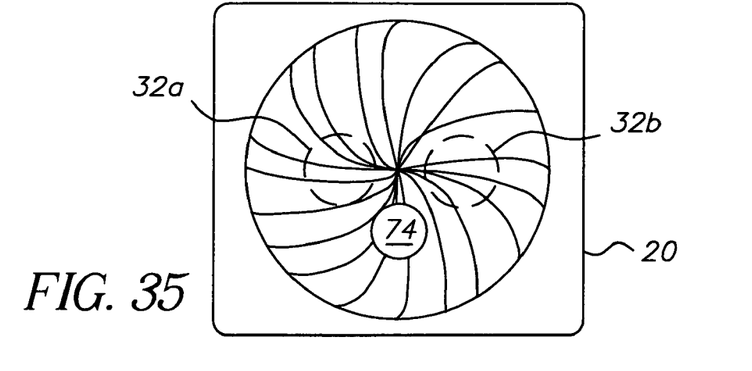
FIG. 35 shows a front view of an expansion structure that is adapted to, at least in part, rotate during expansion.
Figure 36:
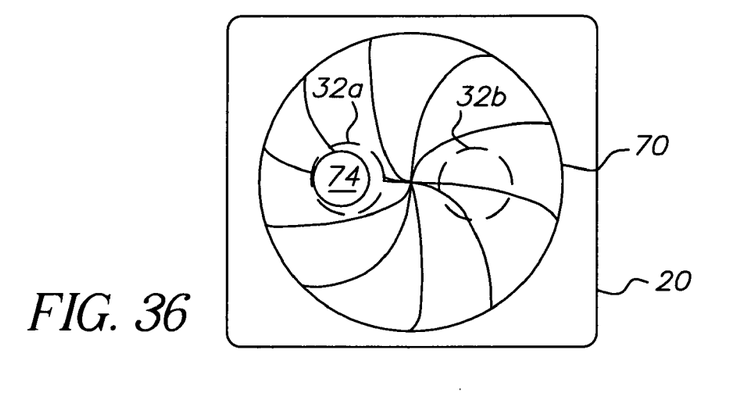
FIG. 36 shows a front view of the embodiment of FIG. 35 during expansion.
Figure 37:
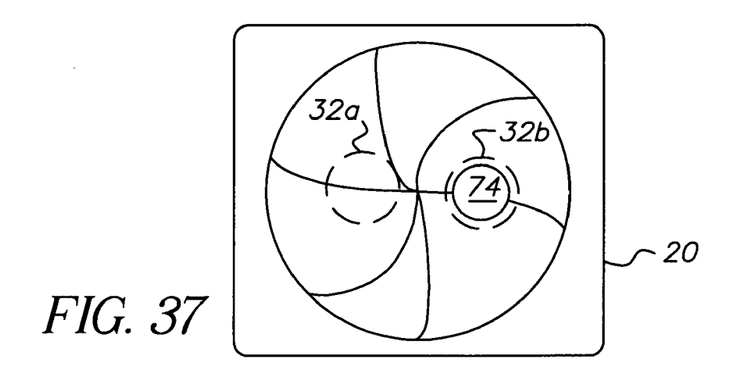
FIG. 37 shows a front view of the embodiment of FIG. 35 with the expansion member in an extended position.

In FIGS. 35–37 a view of another embodiment of a shutter system 36 for use with a camera 20 having multiple apertures 32a and 32b is shown. In this embodiment, light control surface 70 rotates a light admitting area 74 relative to apertures 32a and 32b during expansion of expansion structure 28 from a rest position. As is shown in FIGS. 36 and 37, rotation of light control surface 70 causes a light admitting area 74 to be selectively positioned relative to aperture 32a and then to aperture 32b to start and end exposures from these apertures. Afterward, further expansion rotates light admitting area 74 into the rest position shown in FIG. 35.

In various embodiments described above, light control surface 70 has been described as comprising a light admitting area 74 the relative position of which can be adjusted with respect to an aperture 32, 32a or 32b to start and end an exposure. However it will be appreciated that in any of these embodiments, light control surface 70 can be provided without a light admitting area 74 and expansion structure 28 can be defined to move light control surface 70 into and out of the path of light from the scene to photosensitive element 22 in the same manner that is described for moving light admitting area 74 into and out of the path of light from the scene to photosensitive element 22.

It will also be appreciated that, apertures 32a and 32b can provide different focal lengths, different color filtration characteristics, diffusion characteristics, and other known filtering or light modifications known to those of skill in the art.

Figure 38:
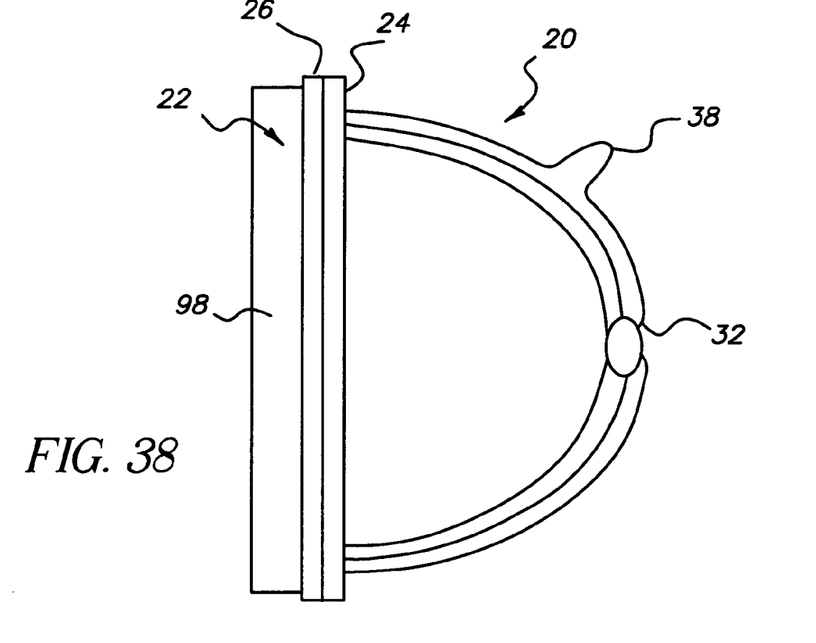
FIG. 38 shows a side section view of another embodiment of the camera of the invention.

Camera 20 can have photosensitive element 22 that can be processed and viewed without removing photosensitive element 22. In one embodiment of this type, shown in FIG. 38, photosensitive element 22 can be formed from a photosensitive element 22 that is adapted to form a visible image from a latent image recorded thereon, when the photosensitive element 22 is exposed to heat. Examples of such a so-called thermographic film, include but are not limited to, the described in commonly assigned U.S. Pat. No. 6,302,599 entitled "Thermal Film Camera with Processing", issued Oct. 16, 2001 in the name of Stoebe et al.; U.S. Pat. No. 5,858,640 entitled "Thermally Processable Imaging Element Comprising Sulfenimide Compounds", issued Jan. 12, 1999 in the name of Cowdery-Corvan et al.; U.S. Pat. No. 6,037,115 entitled "Photothermographic and Thermographic Films Containing Low Levels of Formate to Prevent Fog", issued Mar. 14, 2000 in the name of Alton et al.; and U.S. Pat. No. 6,040,130 entitled "Photothermographic and Thermographic Films Containing Low Levels of Unsaturated Fatty Acid to Prevent Fog", issued Mar. 21, 2000 in the name of Alton et al. In the event that a camera 20 has such a thermographic photosensitive element 22 therein, camera 20 can be made from a material that can be heated in the manner required so that a visible image can be obtained therefrom. One example of such an embodiment is shown in FIG. 38. In this embodiment, support 26 can be made transparent with a removable covering 98 that can be removed after photofinishing so that the recorded image can be backlit and viewed through aperture 32.

Figure 39:
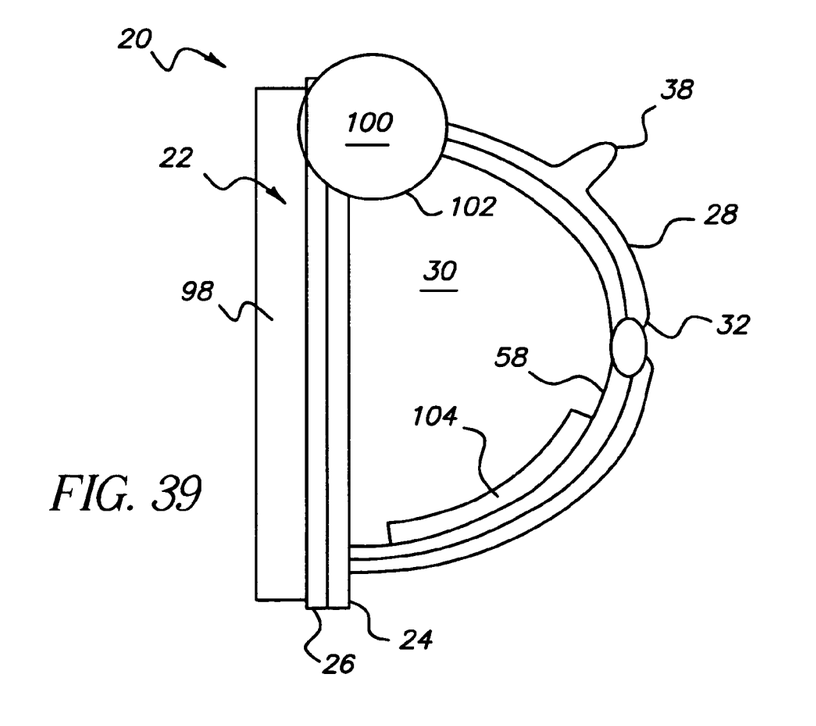
FIG. 39 shows a side section view of another embodiment of the camera of the invention.

In another embodiment of this type, shown in FIG. 39, a separate material chamber 100 can be formed on camera 20 having photofinishing materials therein. Material chamber 100 has a pressure sensitive portion 102 joined to chamber 30 so that when pressure is applied to material chamber 100, pressure sensitive portion 102 opens so that photofinishing chemicals can enter the chamber 30 to convert the latent image to a visible image. Such chemicals can comprise a variety of well known materials which can be absorbed by absorber material 104 provided for example on inside 58 of expansion structure 28. Here too, support 26 can be made transparent with a removable covering 98 that can be removed after photofinishing so that the recorded image can be backlit and viewed through aperture 32.

Figure 40:
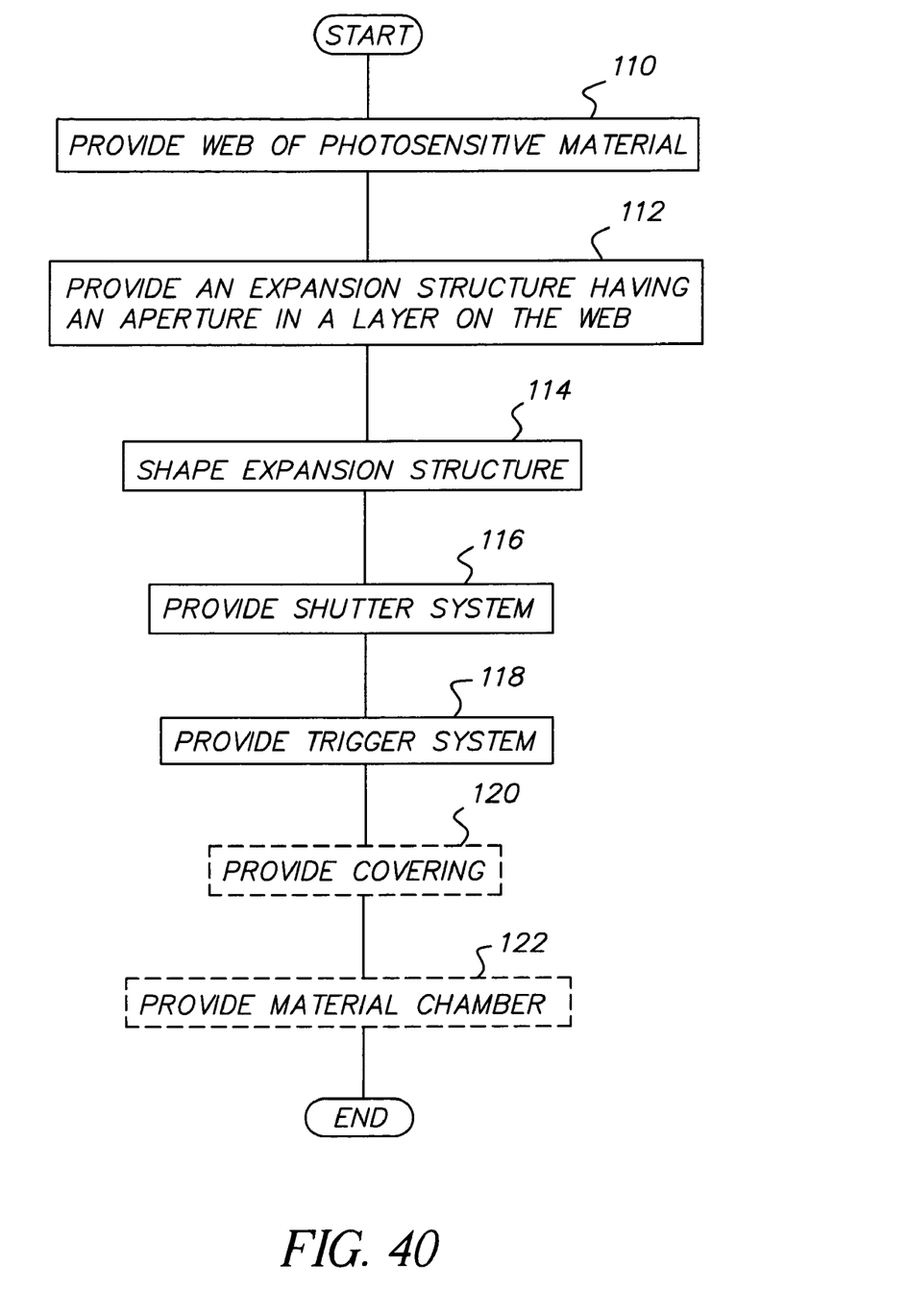
FIG. 40 shows a flow diagram of a method for making a camera.

It will be appreciated that in certain embodiments of camera 20 can be formed in a web type manufacturing process through coating operations and the like. A flow diagram depicting one example of such a method is shown in FIG. 40. As shown in this embodiment, a camera 20 can be formed from the steps of: providing a web of a photosensitive material (step 110). An expansion structure 28 of an elastically deformable material can be provided, for example, by coating a layer on the web to form a light tight region between the expansion layer and the photosensitive material (step 112) with an aperture in the expansion layer adapted to focus light from a scene to form an image on the photosensitive element when the expansion structure is in a selected shape. The expansion layer is shaped in an extended position (step 114) and then the expansion layer is elastically deformed into an initial shape to store potential energy therein, said potential energy being releasable to cause the expansion layer to change from the initial shape to the extended shape. A shutter system is provided (step 116) and a trigger system 38 is provided (step 118). Trigger system 38 is adapted to allow a user to trigger expansion of the expansion structure 28 and to trigger the release of energy for driving the shutter system. In this way, convention roll coating, molding, and/or stamping processes can be used to mass produce cameras 20 of the invention.

In one embodiment, the step of forming a shutter system (step 116) comprises shaping expansion structure 28 so that it has integral outside shutters 60 and 62 and inside shutters 64 and 66 that are driven from a light blocking state to a light passing state and again to a light blocking state by expansion of expansion structure 28 to define an exposure of the photosensitive element 22 to light from the scene. Alternatively, such outside shutters 60 and 62 and inside shutters 64 and 66 can be applied to expansion structure 28 in one or more coated layers.

In another embodiment, the step of forming a shutter system (step 116) comprises applying a shutter system 36 in a layer that is movably attached to the expansion structure 28 or to photosensitive element 22 so that as the expansion layer changes shape, a transmissive portion of the light control layer confronts the aperture to allow a limited amount of light to pass from a scene through aperture 32 to photosensitive element 22.

In still another embodiment, the step of providing a shutter system (step 116) can comprise forming a light blocking surface that is attached to the expansion structure 28 so that the expansion of expansion structure 28 moves the light blocking surface from a light blocking position to a position where light can pass from aperture 32 to the photosensitive element 22, and again to a light blocking position.

Optionally, the method can also include the steps of providing photosensitive element 22 with a transparent support 26 (step 110), and applying a removable covering 98 thereto (step 120). Further, the method can also include the optional step 124 of forming a material chamber 100 adapted to form a visible image from a latent image recorded on the photosensitive element 22 with the material chamber 100 having a pressure sensitive portion 102 as described above. Although photosensitive element 22 has been shown herein as being a flat surface, it will be appreciated that photosensitive element 22 can have a wide variety of shapes, and can, for example, be curved to facilitate image formation.

The invention has been described in detail with particular reference to certain preferred embodiments thereof, but it will be understood that variations and modifications can be effected within the spirit and scope of the invention.

PARTS LIST 20 camera
22 photosensitive element
24 photosensitive layer
24a, 24b photosensitive layer portions
26 support
28 light blocking expansion structure
30 chamber
32, 32a, 32b aperture
34 light
36 shutter system
38 trigger system
42 seal control
46 lens element
50 first light blocking structure
52 outside of expansion structure
54 second light blocking structure
58 inside of expansion structure
60 outside shutter element
62 outside shutter element
64 inside shutter element
66 inside shutter element
70 light control surface
72 light blocking area
74, 74a, 74b light admitting area
78 end
79 end
80 resilient member
82 flexible enclosure
90 external aperture surface
92 large external aperture
94 small external aperture
96 light blocking area
98 covering
100 material chamber
102 pressure sensitive portion
104 absorber material
110 provide Web step
112 apply light control layer step
114 apply expansion layer step
116 apply expansion layer step
118 form trigger layer step
120 provide removable covering step
122 provide photofinishing material chamber step
124 provide photofinishing material step

The invention claimed is:

1. A camera comprising:
a photosensitive element;
a light blocking expansion structure combined with the photosensitive element to form a light tight chamber therebetween, said light blocking expansion structure having an aperture to focus light from a scene to form an image on the photosensitive element, the light blocking expansion structure being adapted to automatically expand from an initial position to an extended position with expansion of the expansion structure positioning the aperture relative to the photosensitive element, and with the expansion of the expansion structure driving a shutter system to start and end an exposure of the photosensitive element to light from the scene; and
a trigger system being manually operable so as to controllably initiate the expansion of the light blocking expansion structure.

2. The camera of claim 1, wherein the aperture is adapted to focus light from a scene to form an image on the photosensitive element when the aperture is positioned within a range of image forming positions and wherein the expansion of the expansion structure moves the aperture to the range of image forming positions.

3. The camera of claim 2, wherein light is allowed to expose the photosensitive element only when the aperture is within the range of image forming positions.

4. The camera of claim 2, wherein said expansion structure moves the aperture through the range of image forming positions and wherein light is allowed to expose the photosensitive element while the aperture is moving through the range of image forming positions.

5. The camera of claim 2, wherein the trigger system is adapted to cause the expansion structure to remain in the initial position and to release the expansion structure to allow the expansion structure to automatically expand from the initial position to the extended position.

6. The camera of claim 1, further comprising a lens in the aperture to focus light from a scene to form an image of the scene on the photosensitive element when the aperture is in a range of image forming positions.

7. The camera of claim 1, wherein the aperture is a slot-shaped opening.

8. The camera of claim 1, wherein the aperture comprises an opening adapted to generate at least one swipe or smear image.

9. The camera of claim 1, wherein said shutter system has a light control surface with a blocking area that blocks light when the blocking area confronts the aperture and a light admitting area permitting light from a scene to pass to the photosensitive element when the light admitting area confronts the aperture, and wherein expansion of the expansion structure causes relative motion of the aperture with respect to the light blocking surface so that the light blocking and light admitting areas of the light blocking surface to selectively confront the aperture to start and to end an exposure.

10. The camera of claim 1, wherein said shutter system comprises at least one light control surface with a light blocking area positioned so that expansion of the expansion element causes the light control surface and aperture to be moved relative to each other to start and end an exposure so that a limited amount of light from the scene can reach the photosensitive element.

11. The camera of claim 2, wherein the shutter system comprises a first light blocking structure formed on the outside of the expansion element proximate to the aperture and a pair of inside shutters formed inside of the expansion element proximate to the aperture, with the first light blocking structure being shaped and joined to the expansion structure so that when the expansion structure is in any position between the initial position and an exposure start position, the first light blocking structure blocks light from reaching the aperture and wherein after the expansion structure has expanded to the exposure start position, the first light blocking structure admits light; and
with a second light blocking structure being shaped and joined to the expansion structure so that when the expansion structure reaches the exposure start position, the second light blocking structure admits light from the scene to reach the photosensitive surface and with said second light blocking structure further being joined to the expansion structure so that the second light blocking structure block light from the scene from reaching the photosensitive surface after expansion structure expands to an exposure stop position.

12. The camera of claim 1, wherein said shutter system comprises first shutters shaped and functionally associated with the expansion structure so that the first shutters together to block light from reaching the photosensitive element until the expansion structure reaches an exposure start position, and second shutters shaped and functionally associated with the expansion structure so that the second shutters are held together to block light from reaching the photosensitive element after the expansion structure expands to an exposure end position.

13. The camera of claim 1, wherein the expansion structure is biased to change from the initial position to the extended position and wherein the trigger system is adapted to hold the expansion structure against the bias when the expansion structure is in the initial position and to release the expansion structure for automatic expansion when the trigger system is in a second state.

14. The camera of claim 1, wherein the expansion structure comprises a resilient material being formed in a extended shape and capable of storing potential energy when the expansion structure is biased from the extended position to the initial position, and further capable of releasing the potential energy to expand to the extended position when triggered by the trigger system.

15. The camera of claim 1, wherein the expansion structure comprises a resilient structure and a flexible enclosure providing a light blocking surface so that the only light that travels to the photosensitive surface is light that passes through the aperture.

16. The camera of claim 1, wherein the expansion structure is combined with the photosensitive element to form an air tight chamber, with a vacuum therein to bias the expansion structure into the initial position, and further wherein said trigger system comprises a vacuum seal that can be manually defeated to release the vacuum.

17. The camera of claim 1, wherein the expansion structure is shaped to provide an internal bias to hold the expansion structure in the initial position, and to further provide a bias that drives the expansion structure into the expanded position when a force is applied in a manner that begins a change in the shape of the expansion structure from the initial position to an intermediary position.

18. The camera of claim 1, wherein the expansion structure is formed from a resilient member defining a frame about which a flexible light blocking covering is placed, said flexible light blocking structure adapted to provide a bias to hold the resilient member in the initial position and to release the bias in response to activation of the trigger system.

19. The camera of claim 1, wherein the photosensitive element is curved to aid in image forming.

20. The camera of claim 1, further comprising a shutter system having a light blocking surface having an opening, wherein the light blocking surface and aperture are movable relative to each other so that the opening is positioned to allow light to flow from the scene to the photosensitive element only while the aperture is in a range of image forming positions.

21. The camera of claim 20, further comprising an aperture surface with a light blocking area having more than one differently sized opening, and wherein the aperture surface can be positioned while the expansion structure is in the initial position, so that a selected one of the openings will confront the aperture during image capture.

22. The camera of claim 21, wherein the light control surface has at least one end that is fixed relative to the expansion structure, and wherein the expansion of the expansion structure advances the aperture relative to the light control surface so the aperture and opening are aligned for a period of time during expansion that is sufficient to form an image on the photosensitive element.

23. The camera of claim 22, wherein the light control surface is adapted to be advanced relative to the opening while the expansion structure is in the range of image capture positions.

24. The camera of claim 1, wherein the photosensitive element comprises a support having a photosensitive layer that can be chemically or thermally modified to form a visible image from a latent image that is recoded thereon.

25. The camera of claim 24, further comprising a source of a chemical material that combines with the photosensitive layer to form a visible image of a latent image recorded thereon.

26. The camera of claim 24, wherein the photosensitive element has a removable light tight coating that can be removed after the latent image has been formed and wherein the support is transparent so that light can pass through the latent image for viewing.

27. The camera of claim 26, wherein the expansion structure has more than one aperture for allowing light from the scene to form separate exposures on different portions of the photosensitive element, and wherein the shutter system is adapted to start and end exposure for each aperture during expansion of the expansion structure.

28. The camera of claim 27, wherein the shutter system starts or ends exposure through each aperture at the same time.

29. The camera of claim 27, wherein the shutter system causes exposure from each aperture to start or end at a different time period.

30. The camera of claim 27, wherein the at least one aperture is adapted to modify light passing therethrough in a manner that is different from the way in which another aperture is adapted to modify light.

31. A camera comprising:
a photosensitive element;
a light blocking expansion structure combined with the photosensitive element, said expansion structure having a first shape and adapted to store potential energy when the shape of the expansion structure is reduced, said expansion structure further being adapted to release a first portion of the potential energy to expand to move an aperture in the expansion structure through at least one position at which light passing through the aperture forms an image on the photosensitive element; and
at least one shutter system to control light between a scene and the photosensitive element, said expansion structure and said shutter system are adapted to cooperate so that a second portion of the stored potential energy is released during exposure to start and end an exposure.

32. A camera comprising:
a photosensitive element;
a light blocking expansion structure combined with the photosensitive element to form an air tight chamber therebetween, said light blocking expansion structure having an aperture to focus light from a scene to form an image on the photosensitive element when the light blocking expansion structure has a first shape, with the air pressure in the air tight chamber reduced to a point where atmospheric pressure reduces the size of the expansion structure;

a shutter system functionally associated with the light blocking expansion structure so that expansion of the light blocking expansion structure drives the shutter system to start and end exposure of the photosensitive element; and a trigger system adapted to allow air into the air tight chamber so as to controllably allow the light blocking expansion structure to expand to the first shape.

33. A method for forming a camera comprising the steps of:

providing a web of a photosensitive material;

applying a shutter system on the photosensitive element;

providing an expansion structure of an elastically deformable material in a layer to the photosensitive material to form a light tight region between the expansion layer and the photosensitive material, said expansion structure having an aperture in the expansion layer adapted to focus light from a scene to form an image on the photosensitive element when the expansion element is in a selected shape;

defining an extended shape of the expansion layer;

elastically deforming the expansion layer into an initial shape, to store potential energy therein, said potential energy being releasable to cause the expansion layer to change from the initial shape to the extended shape; and providing a trigger system on the expansion layer, to initiate expansion of the expansion structure when the expansion structure in the initial shape;

wherein the step of providing a shutter system comprises providing a shutter system that is movably attached to the expansion layer so that as the expansion layer changes shape, the light control layer controllably confronts the aperture to allow a limited amount of light to pass from a scene through the aperture to the photosensitive element.

34. The method of claim 33, wherein the step of providing a shutter system comprises providing a shutter system that is driven from a light blocking state to a light passing state and again to a light blocking state by expansion of the expansion element to start and end exposure of the photosensitive element to light from the scene.

35. The method of claim 33, wherein the step of providing a shutter system comprises applying a shutter system that is movably attached to the expansion layer so that as the expansion layer changes shape, a transmissive portion of the shutter system confronts the opening to allow a limited amount of light to pass from a scene through the opening to the photosensitive element.

36. The method of claim 33, wherein the step of providing a shutter system further comprises the step of providing a light control surface that rotates during expansion of expansion structure to alternatively block and allow light to pass from the scene to the photosensitive element.

37. The method of claim 33, wherein the step of providing a shutter system further comprises the step of providing a light control surface that slides relative to the expansion structure during expansion of expansion structure to alternatively block and allow light to pass from the scene to the photosensitive element.

38. A camera comprising:

a photosensitive element;

a light blocking expansion structure combined with the photosensitive element to form a light tight chamber therebetween, said light blocking expansion structure having an aperture to focus light from a scene to form an image on the photosensitive element, the light blocking expansion structure being adapted to expand from an initial position to an extended position with expansion of the expansion structure positioning the aperture relative to the photosensitive element, and with the expansion of the expansion structure also driving a shutter system to start and end an exposure of the photosensitive element to light from the scene; and a trigger system being manually operable so as to controllably initiate the expansion of the light blocking expansion structure.

* * * * *